(12) United States Patent
Schneider et al.

(10) Patent No.: US 10,942,253 B2
(45) Date of Patent: Mar. 9, 2021

(54) RADAR SYSTEM AND METHOD OF OPERATING A RADAR SYSTEM

(71) Applicants: VOLKSWAGEN AG, Wolfsburg (DE); AUDI AG, Ingolstadt (DE); SICOYA GMBH, Berlin (DE)

(72) Inventors: Thomas Schneider, Michendorf (DE); Jörg Schöbel, Braunschweig (DE); Fabian Schwartau, Braunschweig (DE); Stefan Preußler, Braunschweig (DE); Hanjo Rhee, Berlin (DE); Christoph Scheytt, Dorsten (DE); Michael Schwenkert, Ingolstadt (DE); Thorsten Bagdonat, Braunschweig (DE); Heiko Kurz, Hannover (DE)

(73) Assignees: Volkswagen AG; Audi AG; Sicoya GmbH

( * ) Notice: Subject to any disclaimer, the term of this patent is extended or adjusted under 35 U.S.C. 154(b) by 248 days.

(21) Appl. No.: 16/201,420

(22) Filed: Nov. 27, 2018

(65) Prior Publication Data
US 2019/0162819 A1  May 30, 2019

(30) Foreign Application Priority Data
Nov. 28, 2017 (DE) ............ 10 2017 221 257.8

(51) Int. Cl.
*G01S 7/03* (2006.01)
*G01S 13/34* (2006.01)
(Continued)

(52) U.S. Cl.
CPC .......... *G01S 7/032* (2013.01); *G01S 7/003* (2013.01); *G01S 7/03* (2013.01); *G01S 7/35* (2013.01);
(Continued)

(58) Field of Classification Search
CPC .......... G01S 17/89; G01S 17/26; G01S 17/88; G01S 7/4816; G01S 7/4815;
(Continued)

(56) References Cited

U.S. PATENT DOCUMENTS 6,466,159 B1 * 10/2002 Rotgans ............... G01S 17/86
  342/160
10,069,568 B1 * 9/2018 Middleton .......... H04B 10/503
(Continued)

FOREIGN PATENT DOCUMENTS

DE         19738254 A1    3/1999
DE     102016210771 B3    10/2017
(Continued)

OTHER PUBLICATIONS

Xiaowen et al.; Research on technology of ROF using in Radar; Seventh International Conference on Electronics and Information Engineering; Proc. of SPIE; 2017; vol. 10322.

*Primary Examiner* — Olumide Ajibade Akonai
(74) *Attorney, Agent, or Firm* — Barnes & Thornburg LLP

(57) ABSTRACT

A radar system having at least one radar transmission unit, at least one radar reception unit, a central unit, and a glass fiber for connecting these units, wherein the central unit has a central optical transmission unit to provide an optical radar driver signal, and wherein the at least one radar transmission unit has an optical reception unit and a radar transmitter, wherein the optical reception unit receives the optical radar driver signal and converts the optical radar driver signal into an electrical radar driver signal and provides the electrical
(Continued)

radar driver signal for driving the radar transmitter, wherein the at least one radar reception unit includes a radar receiver, a mixer and an optical modulation unit. Also disclosed is an associated method.

13 Claims, 2 Drawing Sheets

(51) Int. Cl.
*G01S 13/87* (2006.01)
*G01S 7/35* (2006.01)
*G01S 13/931* (2020.01)
*G01S 7/00* (2006.01)
*H04B 10/2575* (2013.01)
*G01S 17/89* (2020.01)

(52) U.S. Cl.
CPC ............ *G01S 13/34* (2013.01); *G01S 13/878* (2013.01); *G01S 13/931* (2013.01); *G01S 17/89* (2013.01); *H04B 10/2575* (2013.01); *H04B 2210/006* (2013.01)

(58) Field of Classification Search
CPC ........ G01S 7/4814; G01S 7/484; G01S 7/486; G01S 7/03; G01S 13/88; G01S 13/885; G01S 7/003; G01S 7/35; G01S 7/032; G01S 17/34; G01S 7/4917; G01S 13/02; G01S 7/352; H01Q 3/2676; H04B 2210/006; H04B 10/2575; H04B 10/50; H04B 10/40; H04B 10/69; H04B 10/90
See application file for complete search history.

(56) References Cited

U.S. PATENT DOCUMENTS

| | | | |
|---|---|---|---|
| 2006/0016969 A1* | 1/2006 | Pescod | G02F 1/0134 250/227.12 |
| 2009/0232191 A1* | 9/2009 | Gupta | H04B 10/40 375/216 |
| 2009/0309783 A1* | 12/2009 | Shih | G01S 7/4052 342/172 |
| 2014/0022119 A1* | 1/2014 | Lohr | G01S 13/02 342/25 R |
| 2017/0153327 A1* | 6/2017 | Nishioka | G01S 17/58 |

FOREIGN PATENT DOCUMENTS

| | | | | |
|---|---|---|---|---|
| EP | 1055941 A2 * | 11/2000 | ............ | G01S 17/95 |
| EP | 1231672 A2 | 8/2002 | | |

\* cited by examiner

RADAR SYSTEM AND METHOD OF OPERATING A RADAR SYSTEM

PRIORITY CLAIM

This patent application claims priority to German Patent Application No. 10 2017 221 257.8, filed 28 Nov. 2017, the disclosure of which is incorporated herein by reference in its entirety.

SUMMARY

Illustrative embodiments relate to a radar system and a method for operating a radar system. Further, illustrative embodiments relate to a central unit, a radar transmission unit and a radar reception unit of such a radar system.

BRIEF DESCRIPTION OF THE DRAWINGS

Disclosed embodiments are explained in more detail below with reference to the figures, in which.

DETAILED DESCRIPTION

Figure 1:
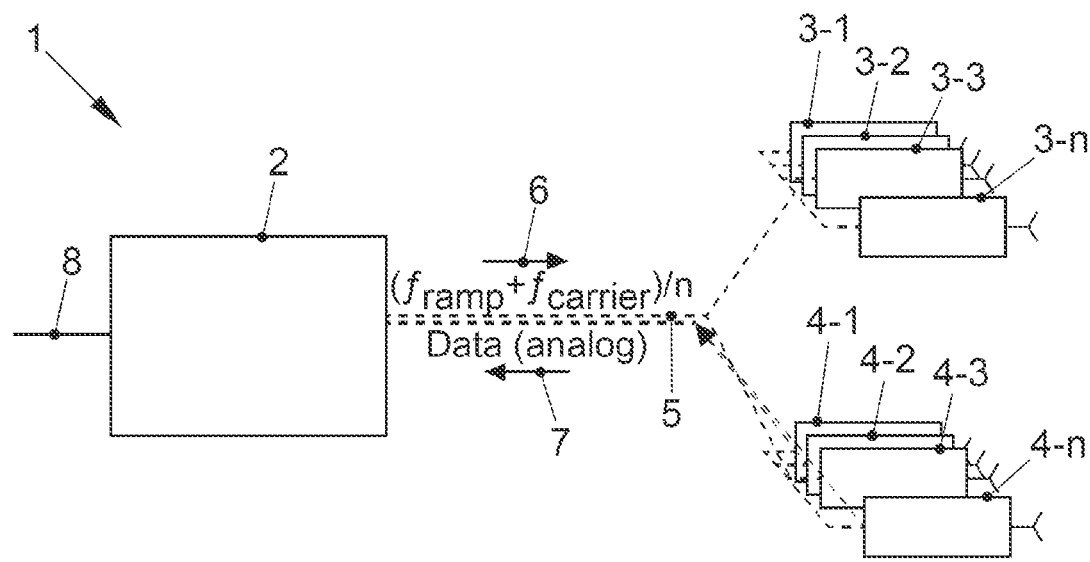
FIG. 1 shows a schematic depiction of an embodiment of the radar system.

In the field of passive safety systems in transportation vehicles, and for autonomous driving at levels 4 and 5, the distinguishability of road users is of importance both for protecting occupants and for protecting other road users. This requires reliable environment detection. To guarantee this, the environment of the transportation vehicle needs to be detected at the highest possible resolution in all three spatial dimensions. Modem camera and LIDAR systems are able to ensure this environment detection, but have their quality influenced or fail completely when visibility is poor, as in the case of fog, snow or in the dark. Radar sensors are not subject to these limitations, on the other hand, but, for the purpose of high resolution three-dimensional imaging, need to be arranged in an array having a multiplicity of sensors.

Furthermore, the individual sensors in such an array need to have their transmission and reception times synchronized. Such synchronization is extremely demanding from a technical point of view. It is thus beneficial if the individual radar sensors are as small, simple, flexible, fault-tolerant, robust and inexpensive as possible. For this purpose, as few electronics as possible should be installed on the radar sensor itself, and the digital data processing should take place centrally within a central control unit.

One problem with these set targets, however, is transmission of the transmitted and received signal of the individual radar sensors. As such, the frequency of the signal to be transmitted in the case of a chosen radar carrier frequency of 78 GHz is approximately 19.5 GHz, for example. Electrical transmission of such a signal can then result in an attenuation of several dB.

Disclosed embodiments provide a radar system and a method for operating a radar system in which a signal transmission is improved.

This is achieved by a radar system and a method.

A radar system is provided, comprising at least one radar transmission unit, at least one radar reception unit, a central unit, and at least one glass fiber, the at least one radar transmission unit and the at least one radar reception unit having at least sections connected to the central unit via the at least one glass fiber, wherein the central unit comprises a central optical transmission unit designed so as to provide an optical radar driver signal and to launch the latter into the at least one glass fiber, and wherein the at least one radar transmission unit comprises an optical reception unit and a radar transmitter, the optical reception unit being designed so as to receive the optical radar driver signal via the at least one glass fiber and to convert it into an electrical radar driver signal and to provide the latter for driving the radar transmitter, wherein the at least one radar reception unit comprises a radar receiver, a mixer and an optical modulation unit, the mixer being designed so as to mix a radar echo signal received by the radar receiver with the electrical radar driver signal, and the modulation unit being designed so as to modulate the mixed signal onto the optical radar driver signal and to launch it into the at least one glass fiber, and wherein the central unit further comprises a central optical reception unit and an evaluation unit, the evaluation unit being designed so as to evaluate the modulated signal received by the central optical reception unit and to output a piece of radar information derived therefrom.

Further, a method for operating a radar system becomes available, comprising: generating and providing an optical radar driver signal by a central optical transmission unit of a central unit, transmitting the optical radar driver signal to at least one radar transmission unit by at least one glass fiber, receiving the optical radar driver signal and converting the optical radar driver signal into an electrical radar driver signal by an optical reception unit of the at least one radar transmission unit, driving the radar transmitter of the radar transmission unit with the electrical radar driver signal, receiving a radar echo signal by a radar receiver of a radar reception unit, mixing the received radar echo signal with the electrical radar driver signal in a mixer of the radar reception unit, modulating the mixed signal onto the optical radar driver signal by a modulation unit of the radar reception unit, transmitting the modulated signal to the central unit via the at least one glass fiber, receiving the modulated signal by a central optical reception unit of the central unit, evaluating the received modulated signal by an evaluation unit of the central unit, outputting a piece of radar information derived therefrom.

Further, a central unit for use in the aforementioned radar system is provided, wherein the central unit comprises a central optical transmission unit designed so as to provide an optical radar driver signal and to launch it into at least one glass fiber, and wherein the central unit further comprises a central optical reception unit and an evaluation unit, the evaluation unit being designed so as to evaluate a modulated signal received by the central optical reception unit and to output a piece of radar information derived therefrom.

In addition, a radar transmission unit for use in the aforementioned radar system is provided, comprising an optical reception unit and a radar transmitter, wherein the optical reception unit is designed so as to receive the optical radar driver signal via a glass fiber and to convert it into an electrical radar driver signal and to provide the latter for driving the radar transmitter.

Finally, a radar reception unit for use in the aforementioned radar system is provided, comprising a radar receiver, a mixer, and a modulation unit, wherein the mixer is designed so as to mix a radar echo signal received by the radar receiver with an electrical radar driver signal, and wherein the modulation unit is designed so as to modulate the mixed signal onto a received optical radar driver signal and to launch it into a glass fiber.

The fundamental concept is to realize a signal transmission between a central unit and a radar transmission unit or a radar reception unit optically. To this end, a radar driver signal is generated optically in the central unit and transmitted to at least one radar reception unit and/or at least one radar transmission unit via at least one glass fiber. In the radar transmission unit, the optical radar driver signal is then converted into an electrical radar driver signal and used for driving a radar transmitter. A radar echo signal received by a radar receiver is mixed with the electrical radar driver signal in a mixer of the radar reception unit. The mixed signal is subsequently modulated onto the optical driver signal by a modulation unit, launched into the glass fiber and transmitted back to the central unit. In the central unit, the modulated optical signal is received and is evaluated by an evaluation unit. The result is subsequently provided as radar information.

The optical and electrical components are co-integrated to generate and receive a radar echo signal. The generation of the radar driver signal is effected optically and centrally in the central unit, and the transmission to a radar transmission unit or to a radar reception unit is likewise effected optically. This can involve the lower—by orders of magnitude—attenuation of a signal being used for the transmission via a glass fiber in contrast to an electrical transmission. The lower attenuation allows a large number of radar transmission units and radar reception units to be jointly supplied with a radar driver signal. Furthermore, glass fibers have a much lower weight than corresponding electrical lines and are less sensitive to external interference, such as electromagnetic fields, for example.

A further benefit of the central optical generation of the radar driver signal is that the radar transmission units and the radar reception units can be manufactured and provided in a compact design with small dimensions. This saves installation space and costs.

The complexity of the radar system lies in the central unit and no longer in the individual radar transmission unit or the individual radar reception unit. This means that the individual radar transmission units and radar reception units are simple and inexpensive to manufacture and, in the event of a fault, simple and quick to replace.

In at least one disclosed embodiment, there is provision for the optical radar driver signal to be modulated onto an optical carrier signal having a wavelength of 1300 nm or 1550 nm. This has the benefit that the telecom wavelengths of a standard glass fiber can be used. Standard glass fibers have low dispersion and low attenuation in these wavelength ranges.

In a further disclosed embodiment, there is provision for the central optical transmission unit to provide the optical radar driver signal at a frequency consistent with a fraction of a carrier frequency necessary for operating the radar transmitter, wherein the at least one radar transmission unit comprises a multiplier unit designed so as to multiply the optical radar driver signal from the frequency to the necessary carrier frequency and to provide the signal. This has the benefit that the optical radar driver signal does not have to be provided at the full necessary carrier frequency. By way of example, there may be provision for a fraction of ⅛ to be chosen. Given a necessary carrier frequency of 77 GHz, the optical carrier signal then need only have a frequency in the region of 19.25 GHz. In the radar transmission unit, the optical radar carrier signal is then electrically multiplied by a multiplier unit and, as a result, brought to the necessary carrier frequency. A further benefit in this instance is that the central provision of the radar driver signal means that the individual radar transmission unit or the individual radar reception unit needs much less energy, which means that problems with the removal of waste heat that arises can be reduced as a result.

In another disclosed embodiment, there is provision for the optical reception unit of the at least one radar transmission unit, to comprise a photodiode, wherein the multiplier unit is further designed so as to multiply the frequency of an electrical signal provided by the photodiode and, as a result, to generate the electrical radar driver signal at the necessary carrier frequency and to provide the signal.

In at least one disclosed embodiment, there is provision for the optical radar driver signal to consist of a radar carrier signal and a radar ramp signal. The radar ramp signal results in the frequency of the radar carrier signal being varied in a particular frequency range (frequency modulated radar, FMCW; QUESTION to inventor: is that correct?). If the optical radar driver signal is provided at only a fraction of the necessary carrier frequency, then the radar carrier signal and the radar ramp signal are accordingly also provided at only a frequency consistent with this fraction. Multiplication is then effected as appropriate in the radar transmission unit or the radar reception unit.

In a further disclosed embodiment, there is provision for the central optical transmission unit for providing the optical radar driver signal to comprise a laser diode and a modulator. This has the benefit that the laser diode itself does not need to be modulated, but rather only needs to provide the optical carrier signal in CW mode. The modulator then modulates the carrier signal provided to provide the optical radar driver signal. The provision of the optical radar driver signal is therefore independent of the dynamic properties of the laser diode. Since the laser diode itself does not need to be modulated, it can be manufactured inexpensively.

In at least one disclosed embodiment, there is provision for a bias voltage of the modulator to be chosen such that dual sideband modulation with a suppressed optical carrier signal occurs. This has the benefit that the optical radar driver signal provided can already be used in combination with a photodiode of a radar transmission unit at the other end of the at least one glass fiber to double the signal. Since the photodiode only reacts to the intensity of the optical wave and at the same time has a relatively small bandwidth, its output current is proportional to a difference frequency of the two optical waves with which it is irradiated in the two sidebands. The photodiode thus already provides a superimposed electrical signal at doubled frequency. Subsequently, this electrical signal then needs to be multiplied correspondingly less often.

In at least one disclosed embodiment, there is provision for the radar system to comprise at least one further radar transmission unit and/or at least one further radar reception unit, wherein the at least one further radar transmission unit and/or the at least one further radar reception unit have at least sections connected to the central unit via the same glass fiber as the at least one radar transmission unit and the at least one radar reception unit. This has the benefit that one glass fiber can be used for multiple radar transmission units and/or multiple radar reception units. The jointly used infrastructure allows installation space and costs to be saved. As a result, even large arrays comprising individual radar transmission units and radar reception units can be constructed in a simple manner.

In a further disclosed embodiment, there is further provision for a bandwidth of the glass fiber to be split by a wavelength division multiplexing (WDM) method and/or a time domain multiplexing (TDM) method. In this manner, the large bandwidth of the glass fiber can be used in optimum state. In this regard, the radar echo signals received and mixed by individual radar receivers in the radar reception units are modulated onto appropriate carrier signals and launched into the glass fiber (WDM) in frequency channels provided for that purpose as appropriate, which are distributed over the bandwidth of the glass fiber. Alternatively or additionally, the individual received and mixed radar echo signals can be distributed over individual time windows and transmitted via the glass fiber (TDM). In this manner, hundreds of radar transmission units and/or radar reception units can be operated using one common glass fiber. This allows a lean and inexpensive infrastructure.

In further disclosed embodiments, there may be provision for the central unit, the radar transmission unit and/or the radar reception unit also to comprise further electrical and/or optical components. As such, by way of example, transimpedance amplifiers and other amplifier devices for boosting electrical signals can be used. Electrical modulators can also be used for the signal processing.

The radar system and the method can be used in the transportation vehicle during environment detection. The radar system, the method, the central unit, the radar transmission unit and the radar reception unit can, in principle, also be used in all areas in which radar systems are used, however. Examples that may be cited in this instance are just aircraft radar systems and ship radar systems.

The benefits described for the radar system are at the same time also the benefits of the method.

FIG. 1 shows a schematic depiction of a disclosed embodiment of the radar system 1. For clarification purposes, optical connections are depicted by dashed lines in this instance. The radar system 1 comprises a central unit 2, radar transmission units 3-1, 3-2, 3-3, . . . , 3-n, radar reception units 4-1, 4-2, 4-3, . . . , 4-n and a glass fiber 5.

The central unit 2 is connected to the radar transmission units 3-1, 3-2, 3-3, . . . , 3-n, and the radar reception units 4-1, 4-2, 4-3, . . . , 4-n via the glass fiber 5. In this instance, it should be noted that, depending on the configuration of the radar system 1, the connection by the glass fiber 5 has at least sections used jointly. Naturally, the individual radar transmission units 3-1, 3-2, 3-3, . . . , 3-n, and radar reception units 4-1, 4-2, 4-3, . . . , 4-n may subsequently each be connected to the glass fiber 5 via noncommon individual waveguides.

In the central unit 2, an optical radar driver signal 6, consisting of a radar carrier signal at the frequency fcarrier and of a radar ramp signal at the frequency framp, is generated by virtue of these being modulated onto an optical carrier signal at a particular carrier frequency. This involves the use of just one frequency, however, which is consistent with a fraction n of the carrier frequency necessary for driving the individual radar transmitters. The optical radar driver signal 6 generated is launched into the glass fiber 5.

The optical radar driver signal 6 is distributed to the individual radar transmission units 3-1, 3-2, 3-3, . . . , 3-n and converted by them into a respective electrical radar driver signal. The latter is then used for driving the respective radar transmitters in the radar transmission units 3-1, 3-2, 3-3, . . . , 3-n. Additionally, the optical radar driver signal 6 is also distributed to the individual radar reception units 4-1, 4-2, 4-3, . . . , 4-n.

The radar echo signals received by the individual radar reception units 4-1, 4-2, 4-3, . . . , 4-n are modulated onto the optical radar driver signal 6 as analog raw data and transmitted to the central unit 2 as a modulated signal 7 by virtue of the modulated signal 7 being launched into the glass fiber 5.

The central unit 2 then receives the respective modulated signal 7 of each radar reception unit 4-1, 4-2, 4-3, . . . , 4-n, evaluates it and provides a piece of radar information 8 derived therefrom.

Figure 2:
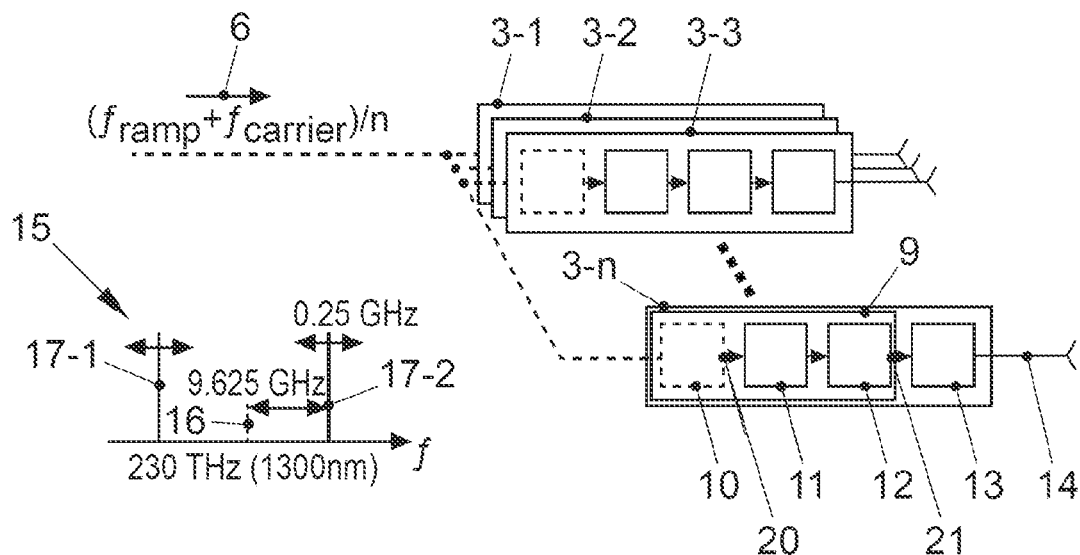
FIG. 2 shows a schematic depiction of an embodiment of a radar transmission unit of the radar system.

FIG. 2 shows a schematic depiction of a disclosed embodiment of the radar transmission units 3-1, 3-2, 3-3, . . . , 3-n of the radar system 1. For clarification purposes, optical connections and units are depicted by dashed lines, and electrical connections and units are depicted by solid lines. The design of the radar transmission units 3-1, 3-2, 3-3, . . . , 3-n is shown by way of example using the radar transmission unit 3-n, but the other radar transmission units 3-1, 3-2, 3-3, . . . are of the same design. The radar transmission unit 3-n comprises an optical reception unit 9, which comprises a photodiode 10, a transimpedance amplifier 11 and a multiplier unit 12, and also an amplifier 13 and a radar transmitter 14.

In the embodiment shown, the optical radar driver signal 6 has been provided by the central unit 2 (FIG. 1 and FIG. 4) for the purpose of dual sideband modulation with the suppressed optical carrier. The frequency spectrum 15 of this provided optical radar driver signal 6 is likewise depicted in FIG. 2 as an inset. By way of example, an optical carrier of 1300 nm or 230 THz has been used for generating the optical radar driver signal 6. The carrier is suppressed in the embodiment shown. Only the two sidebands 17-1, 17-2 are visible. In the example, the necessary carrier frequency fcarrier of the radar carrier signal of the radar transmitter 14 is 77 GHz and the chosen fraction is 1/n=⅛, which means that a frequency of 9.625 GHz is obtained, which has been modulated onto the optical carrier signal 16 at 1300 nm. Accordingly, the two sidebands 17-1, 17-2 are at an interval of 9.625 GHz around the optical carrier signal 16. If a frequency framp of 2 GHz is chosen for a radar ramp signal, then the resultant total frequency in each of the sidebands 17-1, 17-2 varies by 2 GHz/8-0.25 GHz in each case.

The optical radar driver signal 6 is routed to the photodiode 10. Since the photodiode reacts only to the intensity of the optical wave and at the same time has a small bandwidth in comparison with the frequency of the optical carrier, the output current 20 of the photodiode 10 is proportional to a difference frequency of the two optical waves with which it is irradiated in the respective sideband 17-1, 17-2. The electrical signal provided by the photodiode as output current 20 therefore has its frequency doubled in comparison with the frequency of in each case 9.625 GHz provided in each of the sidebands 17-1, 17-2 in the optical radar driver signal 6 to a frequency of 19.25 GHz. This output current 20 is subsequently converted by the transimpedance amplifier 11 into a proportional voltage signal that has its frequency quadrupled by the multiplier unit 12, which is an electrical quadrupler in the embodiment shown, so that in this manner an electrical radar driver signal 21 at the necessary carrier frequency of 77 GHz is generated. This electrical radar driver signal 21 is then boosted in the amplifier 13 and then supplied to the radar transmitter 14.

Figure 3:
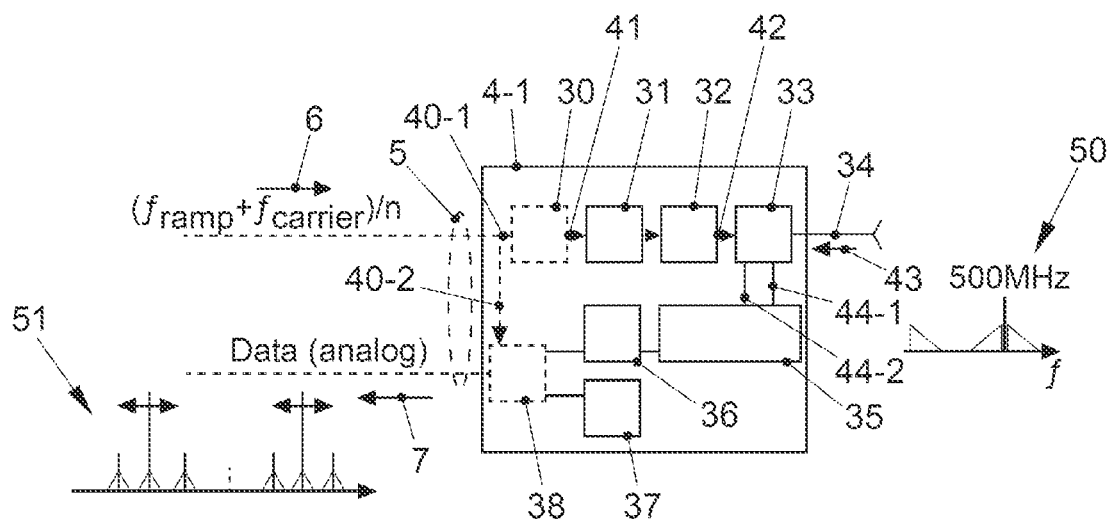
FIG. 3 shows a schematic depiction of an embodiment of a radar reception unit of the radar system.

FIG. 3 depicts a schematic depiction of a disclosed embodiment of a radar reception unit 4-1 of the radar system 1 (FIG. 1). For clarification purposes, optical connections and units are depicted by dashed lines, and electrical connections and units are depicted by solid lines. The radar reception unit 4-1 comprises a photodiode 30, a transimpedance amplifier 31, an electrical multiplier unit 32, an IQ mixer 33, a radar receiver 34, a processing unit 35 and a modulation unit 38, which is controlled by a driver unit 36 and supplied with a bias voltage by a supply unit 37.

The optical driver signal 6 provided by the central unit 2 (FIG. 1) is split into two paths 40-1, 40-2 at the input of the radar reception unit 4-1. In the upper path 40-1, the optical carrier signal 6 is radiated onto the photodiode 30 as in the case of the radar transmission units 3-1, 3-2, 3-3, . . . , 3-$n$ (FIG. 2). The output current 41 delivered by the photodiode 30 has a doubled frequency in this case too (cf. description for FIG. 2). The output current 41 is converted into a proportional voltage signal in the transimpedance amplifier 31 and quadrupled in the multiplier unit 32 and provided as an electrical radar driver signal 42. In the IQ mixer 33, the radar echo signal 43 received and provided by the radar receiver 34 is mixed with the electrical radar driver signal 42. The mixed signal is subsequently processed as I and Q data 44-I, 44-2 in the processing unit 35. The processing unit 35 modulates the I and Q data 44-1, 44-2 onto an electrical carrier frequency, for example. In the present example, a carrier frequency of 500 MHz was chosen for one of the two data, for example (see frequency spectrum 50 in the right-hand inset of FIG. 3). The mixed and processed signal is subsequently modulated onto the optical radar driver signal 6 by the modulation unit 38, which may be a Mach-Zehnder modulator, for example, by the driver unit 36, the optical radar driver signal being supplied to the modulation unit 38 via the second path 40-2. The modulated signal 7 is subsequently launched into the glass fiber 5 and transmitted to the central unit 2 (FIG. 1). The inset on the left-hand side of FIG. 3 shows a frequency spectrum 51 by way of example, the modulated signal 7 modulated onto the optical radar driver signal 6 being visible in the frequency spectrum.

Figure 4:
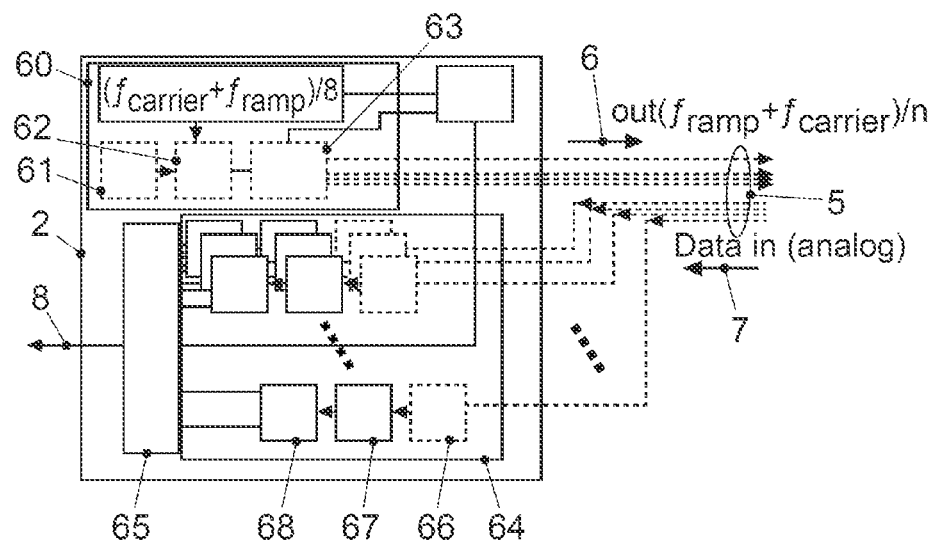
FIG. 4 shows a schematic depiction of an embodiment of a central unit of the radar system.

FIG. 4 shows a schematic depiction of a disclosed embodiment of a central unit 2 of the radar system 1 (FIG. 1). To provide the optical radar driver signal 6, the central unit 2 comprises a central optical transmission unit 60. The central optical transmission unit 60 comprises a laser diode 61, a modulator 62 and optionally a 1:N switch 63. The laser diode 61 provides a CW signal at a prescribed optical carrier frequency. This carrier frequency may be oriented to the telecommunication windows of the glass fiber 5, which are at 1300 nm and 1550 nm. The modulator 62, for example, a Mach-Zehnder modulator, modulates the radar driver signal, consisting of a radar carrier signal and a radar ramp signal, onto the CW signal of the laser diode 61, the radar driver signal being modulated on at only a fraction 1/n of the necessary carrier frequency. In the embodiment shown, the fraction is ⅛, which means that a frequency of 9.625 GHz is modulated on at a necessary carrier frequency of 77 GHz. In the embodiment shown, a bias voltage of the modulator 62 was chosen such that dual sideband modulation with a suppressed optical carrier occurs. The optional 1:N switch 63 ensures that the optical radar driver signal 6 can be provided on multiple channels for the individual radar transmission units and radar reception units.

For the purpose of receiving and evaluating the modulated signal 7 or the modulated signals 7 of the individual radar reception units, the central unit 2 comprises a central optical reception unit 64 and an evaluation unit 65. The central optical reception unit 64 comprises a respective photodiode 66, transimpedance amplifier 67 and IQ mixer 68 for each modulated signal 7 that is to be evaluated for an associated radar reception unit. Additionally, the central optical reception unit 64 can also have filter units for selecting individual wavelength ranges, etc. Each of the modulated signals 7 is converted into a respective output current by the photodiode 66, and the output current is converted into a proportional voltage signal in the transimpedance amplifier 67 and subsequently demodulated in the IQ mixer. The demodulated signal is supplied to the evaluation unit 65, which digitizes it, evaluates it and derives and outputs a piece of radar information 8 therefrom. The radar information 8 can subsequently be processed further, so that environment detection can be realized.

LIST OF REFERENCE SIGNS

1 Radar system
2 Central unit
3-1 Radar transmission unit
3-2 Radar transmission unit
3-3 Radar transmission unit
3-$n$ Radar transmission unit
4-1 Radar reception unit
4-2 Radar reception unit
4-3 Radar reception unit
4-$n$ Radar reception unit
5 Glass fiber
6 Optical radar driver signal
7 Modulated signal
8 Radar information
9 Optical reception unit
10 Photodiode
11 Transimpedance amplifier
12 Multiplier unit
13 Amplifier
14 Radar transmitter
15 Frequency spectrum
16 Optical carrier signal
17-1 Sideband
17-2 Sideband
20 Output current
21 Electrical radar driver signal
30 Photodiode
31 Transimpedance amplifier
32 Multiplier unit
33 IQ mixer
34 Radar receiver
35 Processing unit
36 Driver unit
37 Supply unit
38 Modulation unit
40-1 Path
40-2 Path
41 Output current
42 Electrical radar driver signal
43 Radar echo signal
44-1 I data
44-2 Q data
50 Frequency spectrum
51 Frequency spectrum
60 Central optical transmission unit
61 Laser diode
62 Modulator
63 1:N switch
64 Central optical reception unit
65 Evaluation unit
66 Photodiode
67 Transimpedance amplifier
68 IQ mixer

The invention claimed is:

1. A radar system comprising:
   at least one radar transmission unit; at least one radar reception unit;
   a central unit; and
   at least one glass fiber,
   wherein the at least one radar transmission unit and the at least one radar reception unit have at least sections connected to the central unit via the at least one glass fiber,
   wherein the central unit comprises a central optical transmission unit configured to provide an optical radar driver signal and to launch the optical radar driver signal into the at least one glass fiber,
   wherein the at least one radar transmission unit comprises an optical reception unit and a radar transmitter, wherein the optical reception unit receives the optical radar driver signal via the at least one glass fiber and converts the optical radar driver signal into an electrical radar driver signal and provides the electrical radar driver signal for driving the radar transmitter,
   wherein the at least one radar reception unit comprises a radar receiver, a mixer and an optical modulation unit, the mixer mixes a radar echo signal received by the radar receiver with the electrical radar driver signal, and the optical modulation unit modulates the mixed signal onto the optical radar driver signal and launches the optical radar driver signal into the at least one glass fiber, and
   wherein the central unit further comprises a central optical reception unit and an evaluation unit, the evaluation unit evaluates the modulated signal received by the central optical reception unit and outputs a piece of radar information derived therefrom.

2. The radar system of claim 1, wherein the optical radar driver signal is modulated onto an optical carrier signal having a wavelength of 1300 nm or 1550 nm.

3. The radar system of claim 1, wherein the central optical transmission unit provides the optical radar driver signal at a frequency consistent with a fraction of a carrier frequency necessary for operating the radar transmitter, wherein the at least one radar transmission unit comprises a multiplier unit to multiply the optical radar driver signal from the frequency to the necessary carrier frequency and to provide the signal.

4. The radar system of claim 3, wherein the optical reception unit of the at least one radar transmission unit comprises a photodiode, wherein the multiplier unit multiplies the frequency of an electrical signal provided by the photodiode and generates the electrical radar driver signal at the necessary carrier frequency in response to the multiplier unit multiplying the frequency of an electrical signal provided by the photodiode and provides the signal.

5. The radar system of claim 1, wherein the optical radar driver signal consists of a radar carrier signal and a radar ramp signal.

6. The radar system of claim 1, wherein the central optical transmission unit for providing the optical radar driver signal comprises a laser diode and a modulator.

7. The radar system of claim 6, wherein a bias voltage of the modulator is chosen so that dual sideband modulation with a suppressed optical carrier signal occurs.

8. A radar system of claim 1, wherein the radar system comprises at least one further radar transmission unit and/or at least one further radar reception unit, wherein the at least one further radar transmission unit and/or the at least one further radar reception unit have at least sections connected to the central unit via the same glass fiber as the at least one radar transmission unit and the at least one radar reception unit.

9. The radar system of claim 8, wherein a bandwidth of the glass fiber is split by a wavelength division multiplexing method and/or a time domain multiplexing method.

10. A method for operating a radar system, comprising:
    generating and providing an optical radar driver signal by a central optical transmission unit of a central unit;
    transmitting the optical radar driver signal to at least one radar transmission unit by at least one glass fiber;
    receiving the optical radar driver signal and converting the optical radar driver signal into an electrical radar driver signal by an optical reception unit of the at least one radar transmission unit;
    driving the radar transmitter of the radar transmission unit with the electrical radar driver signal;
    receiving a radar echo signal by a radar receiver of a radar reception unit;
    mixing the received radar echo signal with the electrical radar driver signal in a mixer of the radar reception unit;
    modulating the mixed signal onto the optical radar driver signal by a modulation unit of the radar reception unit;
    transmitting the modulated signal to the central unit via the at least one glass fiber;
    receiving the modulated signal by a central optical reception unit of the central unit;
    evaluating the received modulated signal by an evaluation unit of the central unit; and
    outputting a piece of radar information derived therefrom.

11. A central unit for use in a radar system comprising:
    at least one radar transmission unit;
    at least one radar reception unit;
    a central unit; and
    at least one glass fiber, the at least one radar transmission unit and the at least one radar reception unit having at least sections connected to the central unit via the at least one glass fiber, wherein the central unit comprises a central optical transmission unit to provide an optical radar driver signal and to launch the optical radar driver signal into the at least one glass fiber,
    wherein the at least one radar transmission unit comprises an optical reception unit and a radar transmitter, wherein the optical reception unit receives the optical radar driver signal via the at least one glass fiber and converts the optical radar driver signal into an electrical radar driver signal and provides the electrical radar driver signal for driving the radar transmitter,
    wherein the at least one radar reception unit comprises a radar receiver, a mixer and an optical modulation unit, the mixer mixes a radar echo signal received by the radar receiver with the electrical radar driver signal, and the optical modulation unit modulates the mixed signal onto the optical radar driver signal and launches the optical radar driver signal into the at least one glass fiber,
    wherein the central unit further comprises a central optical reception unit and an evaluation unit, the evaluation unit evaluates the modulated signal received by the central optical reception unit and outputs a piece of radar information derived therefrom,
    wherein the central unit comprises a central optical transmission unit to provide an optical radar driver signal and to launch the optical radar driver signal into at least one glass fiber, and wherein the central unit further comprises a central optical reception unit and an evaluation unit, wherein the evaluation unit evaluates a modulated signal received by the central optical reception unit and outputs a piece of radar information derived therefrom.

12. A radar transmission unit for use in a radar system that also includes at least one radar reception unit, a central unit, and at least one glass fiber, wherein the at least one radar transmission unit and the at least one radar reception unit having at least sections connected to the central unit via the at least one glass fiber, wherein the central unit comprises a central optical transmission unit to provide an optical radar driver signal and to launch the optical radar driver signal into the at least one glass fiber, wherein the at least one radar transmission unit comprises an optical reception unit and a radar transmitter, wherein the optical reception unit receives the optical radar driver signal via the at least one glass fiber and converts the optical radar driver signal into an electrical radar driver signal and provides the electrical radar driver signal for driving the radar transmitter, wherein the at least one radar reception unit comprises a radar receiver, a mixer and an optical modulation unit, the mixer mixes a radar echo signal received by the radar receiver with the electrical radar driver signal, and the optical modulation unit modulates the mixed signal onto the optical radar driver signal and launches the optical radar driver signal into the at least one glass fiber, wherein the central unit further comprises a central optical reception unit and an evaluation unit, the evaluation unit evaluates the modulated signal received by the central optical reception unit and outputs a piece of radar information derived therefrom;

wherein the radar transmission unit comprises an optical reception unit, and a radar transmitter, and wherein the optical reception unit receives the optical radar driver signal via a glass fiber and converts the optical radar driver signal into an electrical radar driver signal and provides the electrical radar driver signal for driving the radar transmitter.

13. A radar reception unit for use in a radar system that also includes at least one radar transmission unit, a central unit, and at least one glass fiber, wherein the at least one radar transmission unit and the at least one radar reception unit having at least sections connected to the central unit via the at least one glass fiber, wherein the central unit comprises a central optical transmission unit to provide an optical radar driver signal and to launch the optical radar driver signal into the at least one glass fiber, wherein the at least one radar transmission unit comprises an optical reception unit and a radar transmitter, wherein the optical reception unit receives the optical radar driver signal via the at least one glass fiber and converts the optical radar driver signal into an electrical radar driver signal and provides the electrical radar driver signal for driving the radar transmitter, wherein the at least one radar reception unit comprises a radar receiver, a mixer and an optical modulation unit, the mixer mixes a radar echo signal received by the radar receiver with the electrical radar driver signal, and the optical modulation unit modulates the mixed signal onto the optical radar driver signal and launches the optical radar driver signal into the at least one glass fiber, wherein the central unit further comprises a central optical reception unit and an evaluation unit, the evaluation unit evaluates the modulated signal received by the central optical reception unit and outputs a piece of radar information derived therefrom;

wherein the radar reception unit comprises a radar receiver, a mixer, and a modulation unit, and wherein the mixer mixes a radar echo signal received by the radar receiver with an electrical radar driver signal, and wherein the modulation unit modulates the mixed signal onto a received optical radar driver signal and launches the received optical radar driver signal into a glass fiber.

* * * * *